United States Patent [19]

Retzler

[11] 4,067,563
[45] Jan. 10, 1978

[54] TAPE SPLICER

[75] Inventor: William Retzler, Norwich, England

[73] Assignee: Bib Hi-Fi Accessories Limited, Hemel Hempstead, England

[21] Appl. No.: 734,523

[22] Filed: Oct. 21, 1976

[30] Foreign Application Priority Data

Mar. 18, 1976   United Kingdom ............... 10838/76

[51] Int. Cl.² .............................................. B25B 1/24
[52] U.S. Cl. ................................ 269/254 R; 156/502; 269/295
[58] Field of Search .......................... 269/295, 254 R; 156/502, 506

[56] References Cited

U.S. PATENT DOCUMENTS

| | | | |
|---|---|---|---|
| 1,506,368 | 8/1924 | Fancher | 269/254 R |
| 2,660,221 | 11/1953 | Simpson | 156/506 |

*Primary Examiner*—Robert C. Watson
*Attorney, Agent, or Firm*—Finnegan, Henderson, Farabow & Garrett

[57] ABSTRACT

A tape splicer comprising a base and at least one clamping member pivotably mounted on the base for movement between a first position and a second position for respectively clamping a tape against the base and allowing tape to be placed on or lifted off the base, a clamping portion of the clamping member, in the first position, being resiliently pressed against a clamping surface of the base by virtue of elastic deformation of part of the tape splicer.

11 Claims, 11 Drawing Figures

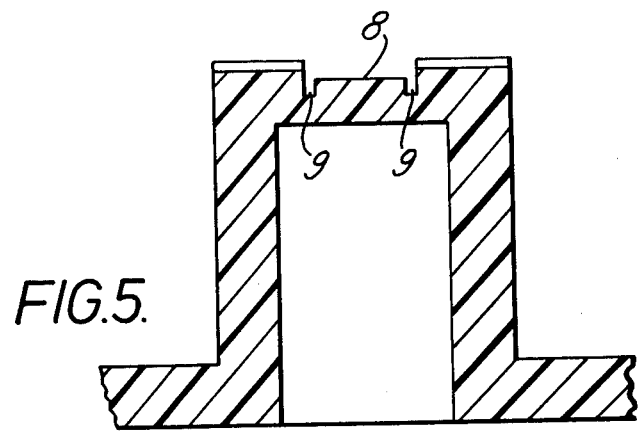
FIG.5.
FIG.6.
FIG.7.
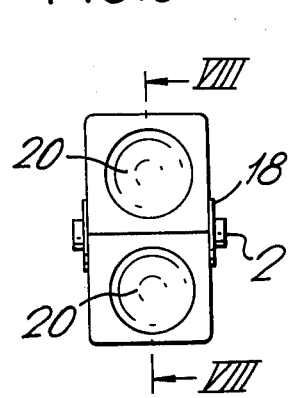
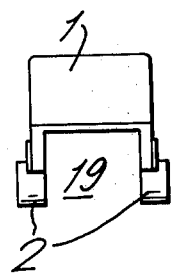
FIG.8.
FIG.9.
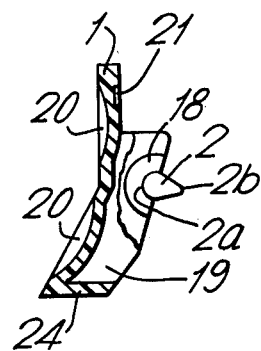
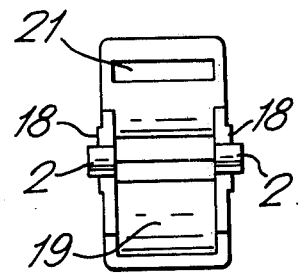

TAPE SPLICER

BACKGROUND OF THE INVENTION

This invention relates to a tape splicer, particularly, although not exclusively a tape splicer for splicing magnetic recording tape.

BRIEF SUMMARY OF THE INVENTION

According to a first aspect of the invention, there is provided a tape splicer including a base and a clamping member pivotally mounted on the base, a clamping portion of the clamping member being for clamping tape to be spliced against a clamping surface of the base and the clamping member being movable between a first and a second position in which first position a bearing part of the clamping member bears against a bearing surface, which is integral with the base, on one side of a plane which is normal to said bearing surface and contains the axis of the pivotal connection, and a part of the tape splicer is resiliently deformed so that owing to the resilience the clamping portion of the clamping member presses against said clamping surface of the base to clamp any tape that may be present between the two, and in which second position the bearing part of the clamping member bears against said bearing surface on the other side of said plane, and the clamping portion of the clamping member does not press against the clamping surface of the base so that tape can be removed from it or laid on it.

According to a second aspect of the invention, there is provided a kit of parts constructed to be assembled to make a tape splicer according to the first aspect of the invention, the kit of parts including the base and the clamping member with provision for the pivotal connection.

Preferably, the portion of the tape splicer which is deformed when the clamping member is in the first position is a portion of the base which is integral with the rest of the base. The said portion of the base may be a flexible sheet which is defined between two parallel slots which are perpendicular to the axis of the pivotal connection, the flexible sheet affording the bearing surface.

Preferably, the bearing part of the clamping member has at one extremity a portion which engages a portion of the base to provide the pivotal connection between the clamping member and the base and has at an opposite extremity a rounded tip one side of which engages the bearing surface in one position of the clamping member and the other side of which engages the bearing surface in the other position of the clamping member. The clamping member may have two bearing parts, one on each side of the clamping member. The clamping member may be pushed on to the base and snap-fitted to it, preferably be being pushed into a recess in the base the width of which progressively decreases and then suddenly increases, proceeding from the mouth of the recess towards its base, so that two shoulders are formed inside the recess behind which the bearing parts of the clamping member snap with the result that the clamping member cannot easily be pulled out of the recess.

There is preferably a second clamping member, which is constructued and co-operates with the base as indicated above for the first clamping member, pivotally mounted on the base, the two clamping members serving to clamp the tape against the base at opposite sides of a zone in which cutting and splicing of the tape is to be effected.

The base is preferably provided with a flatbottomed, elongate shallow recess for the tape, inside which, along the two opposite edges, are deeper grooves along which the edge of a razor blade may run. There is also preferably one or more transverse grooves in the floor of the recess for example one at 45° to the length of the recess and another perpendicular to it, along which the edge of a razor blade may run.

BRIEF DESCRIPTION OF THE DRAWINGS

FIG. 5 shows the sectional view of part of the base, taken as indicated by the arrows V in FIG. 3, FIG. 6 is a plan view of a clamping member of the tape splicer, FIG. 7 is an end view of the clamping member, FIG. 8 is a sectional side view of the clamping member taken as indicated by the arrows VIII in FIG. 6, and FIG. 9 is an underneath plan view of the clamping member.

DETAILED DESCRIPTION OF A PREFERRED EMBODIMENT

Figure 1A:
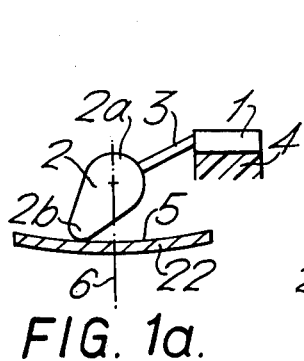
FIGS. 1a, 1b and 1c diagrammatically illustrate the principle behind the invention.
Figure 1B:
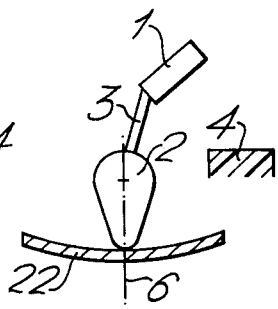
Figure 1C:
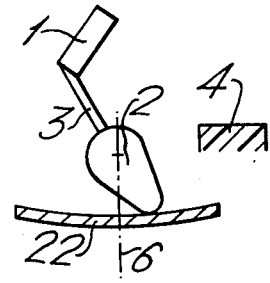

FIGS., 1a, 1b, and 1c diagrammatically show a clamping member having portion 1 and a bearing part 2 fixed together by an intermediate part 3. The clamping member is pivotally mounted on a base and is movable, by turning it about the pivot axis, between a first position, shown in FIG. 1a, and a second position, shown in FIG. 1c, through an intermediate position, shown in FIG. 1b. The bearing part 2 is elongate and at its upper extremity it has a rounded portion 2a, which engages a portion of the base to provide the pivotal connection, whereas at its lower extremity it has a rounded tip 2b. In the first position the bearing part 1 of the clamping member presses against a bearing surface afforded by a part 4 of the base, to clamp any tape that may be present between the two, and the tip 2b bears against a flat bearing surface 5, afforded by a flexible sheet 22 which is intregral with the base, on the left-hand side of a plane 6 that is normal to the flat bering surface 5 and contains the axis of the pivotal connection. In this position, the flexible sheet 22 is stressed and deformed and since it is resilient, being made of moulded, resilient, plastics material, there is a tendency for the flexible sheet to revert to its unstressed flat configuration which would involve moving the clamping member in the clockwise direction about the pivotal connection. Thus, due to the deformation and resilience of the material of the flexible sheet 22, the clamping portion 1 bears firmly upon the part 4.

In the second position, the flexible sheet 22 is still stressed and deformed. However, in this second position, the tip 2b of the clamping member is on the right-hand side of the plane 6, and so the flexible sheet, in tending to resume its flat, unstressed configuration, urges the clamping member to move in the anti-clockwise direction about the pivotal connection, thus retaining the clamping portion 1 clear of the part 4 of the base, so that tape can be removed from it or placed on it. The anti-clockwise movement of the clamping member is arrested, before the flexible sheet is completely unstressed, by contact between a part of the clamping member and the base (not shown in FIG. 1c).

In the intermediate position, the flexible sheet is even more deformed than it is in either of the first and second positions. This causes a "snap" action as the clamping member is moved through the intermediate position and the flexible sheet rapidly reverts to one of the less deformed configurations shown in FIGS. 1a and 1c.

Figure 2:
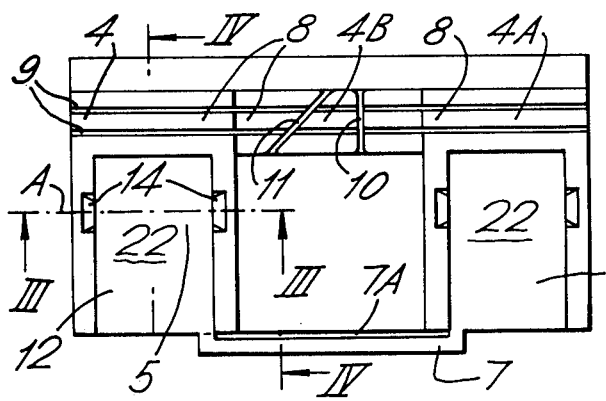
FIG. 2 shows a plan view of a base of a tape splicer.
Figure 3:
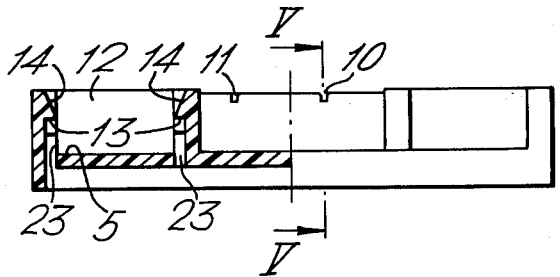
FIG. 3 shows a front elevation of the base, partly in section taken as indicated by the arrows III in FIG. 2.
Figure 4:
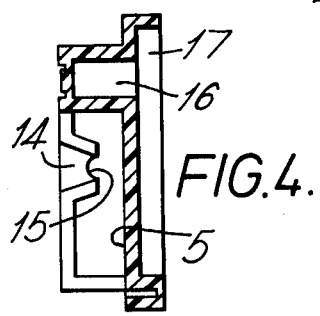
FIG. 4 shows a sectional side view of the base, taken as indicated by the arrows IV in FIG. 2.

The base shown in FIGS. 2 and 5 is a single piece of thermoplastics material made by injection moulding and is almost a parallelepiped. At its rear side there is a projecting piece 7 formed with a slot 7A to receive the edge of a single-edge razor blade having a backing which makes it reasonably safe to use to cut magnetic recording tape and excess adhesive tape used for joining it. Two lengths of tape to be joined are placed on the base in overlapping relationship and then both of them are clamped respectively to the front parts 4 and 4A of the base in each case by a clamping member described below and shown in FIGS. 6 to 9. A flat-bottomed, elongate, shallow recess 8, ⅛ inch (3.2 mm) wide, receives both lengths of tape and it extends the entire length of the front of the base, as do deeper grooves 9 inside and in the floor of the recess 8 along the two opposite edges of it for receiving and guiding the edge of a razor blade used to cut off surplus magnetic tape and/or adhesive tape placed on it. Between the front parts 4 and 4A, there is a part 4B where the two ends of the tape can be cut off, after clamping, by the edge of the razor blade which is run along a groove 10 perpendicular to the length of the recess 8 or a groove 11 at 45° to the length of the recess 8. In each end of the base there is formed a recess 12 the width of which, measured along the line A, progressively decreases, proceeding from the mouth of the recess towards its base, and then suddenly increases, leaving shoulders 13 perpendicular to the depth of the recess, below sloping surfaces 14. The material at opposite sides of each recess 12 provides a concavely rounded surface 15 facing the flat surface 5. The bottom of each recess 12 is afforded by the flexible sheet 22 which is defined between two parallel slots 23 which are perpendicular to the axis of the pivotal connection between the clamping member and the base (this axis lies on the line A). To save plastics material, there are recesses 16 and 17 in the under side of the base.

There are two identical clamping members which can be pushed into the recesses 12, each of them being as shown in FIGS. 6 to 9 and having the clamping portion 1 and, at opposite sides of the clamping member, two bearing parts 2 each having the convexly rounded part 2a, which engages one of the concavely rounded surfaces 15 to form the pivotal connection, and the rounded tip 2b, the distance between the pivot axis and the end of the tip 2b being greater than the distance between the pivot axis and the flat surface 5 when the sheet 22 is not stressed. In assembling it, each clamping member is pushed into one of the recesses 12 and the bearing parts 2 run down, in contact with the sloping surfaces 14 and are forced towards each other, until the bearing parts 2 snap behind the shoulders 13. Semi-circular raised portions 18 of the clamping member then engage the walls of the recess 12. Between the bearing parts 2 there is a deep recess 19 in the clamping member and in the material of the clamping member above this recess is a finger-depression 20, as there is also in the clamping portion 1. A recess 21 is formed in the clamping portion 1; this can receive a pad (not shown). By pressing the finger into first one and then the other of the depressions 20, the clamping member can be made to turn from a first position, in which the clamping portion 1 presses against the part 4, as explained with reference to FIG. 1a, to a second position, in which the clamping portion 1 is raised clear of the part 4, so that tape can be laid on it or removed from it, as explained with reference to FIG. 1c, and back to the first position. The clamping member includes an end wall portion 24 which, in the second position, contacts the surface 5 to limit the anti-clockwise movement of the clamping member, as mentioned with reference to FIG. 1c.

I claim:

1. A tape splicer comprising
a base, comprising a one-piece moulding which includes a bearing surface and a clamping surface, and
at least one clamping member including a clamping portion and a bearing part, the clamping member being pivotally connected to the base for movement between a first position and a second position, in which first position the said bearing part bears against the bearing surface on one side of a plane normal to the bearing surface and containing the axis of the pivotal connection, and a part of the tape splicer is elastically deformed, the resilience of which part causes the clamping portion to be pressed towards the clamping surface, and in which second position the said bearing part bears against the bearing surface on the other side of the said plane and the said clamping portion is spaced from the clamping surface.

2. A splicer in accordance with claim 1, in which the bearing part has at one extremity a portion which engages a portion of the base to provide the pivotal connection between the clamping member and the base and has at the opposite extremity a rounded tip one side of which engages the bearing surface in the first position and the other side of which engages the bearing surface in the second position.

3. A splicer in accordance with claim 2, in which the clamping member has two bearing parts, one on either side of the clamping member.

4. A splicer in accordance with claim 3, in which the clamping member is snap-fitted on to the base.

5. A splicer in accordance with claim 4, in which the clamping member is inserted into a recess in the base the width of which recess progressively decreases and then suddenly increases, proceeding from the mouth of the recess towards its interior, the recess providing two shoulders behind which the bearing parts of the clamping member snap.

6. A splicer in accordance with claim 5, in which two clamping members are provided, at opposite ends of a cutting and splicing zone of the base.

7. A tape splicer comprising
a base, comprising a one-piece moulding which includes a bearing surface and a clamping surface, and
at least one clamping member including a clamping portion and a bearing part, the clamping member being pivotally connected to the base for movement between a first position and a second position, in which first position the said bearing part bears against the bearing surface on one side of a plane normal to the bearing surface and containing the axis of the pivotal connection, a part of the base then being elastically deformed, the resilience of which part causes the clamping portion to be pressed towards the clamping surface, and in which second position the said bearing part bears against the bearing surface on the other side of the said plane and the said clamping portion is spaced from the clamping surface.

8. A splicer in accordance with claim 7, in which the said part of the base is the bearing surface which is constructed as a flexible sheet defined between two parallel slots which are perpendicular to the axis of the pivotal connection.

9. A splicer in accordance with claim 8, in which the base is provided with a flat-bottomed elongate shallow tape-receiving recess inside which, along the two opposite edges, are deeper blade guide grooves.

10. A splicer in accordance with claim 9, in which at least one generally transverse blade guide groove is provided in the floor of the recess.

11. A kit of parts for assembly to make a tape splicer, the kit comprising:
   a base, comprising a one-piece moulding which includes a bearing surface and a clamping surface,
   at least one clamping member including a clamping portion and a bearing part,
   the base and the or each clamping member including means which, when the kit is assembled, afford a pivotal connection which allows pivotal movement of the or each clamping member between a first position and a second position, in which first position the bearing part bears against the bearing surface on one side of a plane normal to the bearing surface and containing the axis of the pivotal connection, and a part of the tape splicer is elastically deformed, the resilience of which part causes the clamping portion to be pressed towards the clamping surface, and in which second position the said bearing part bears against the bearing surface on the other side of the said plane and the said clamping portion is spaced from the clamping surface.

* * * * *